United States Patent [19]
DiPerry

[11] 3,870,997
[45] Mar. 11, 1975

[54] AUTOMATIC GAIN INTEGRATOR CONTROL
[75] Inventor: John DiPerry, Riverside, Calif.
[73] Assignee: The United States of America as represented by the Secretary of the Navy, Washington, D.C.
[22] Filed: Feb. 3, 1965
[21] Appl. No.: 431,491

[52] U.S. Cl. ............................................. 343/18 E
[51] Int. Cl. ............................................. G01s 7/36
[58] Field of Search ............ 343/18, 18 E, 5 A, 5 G, 343/5 C, 17.1

[56] References Cited
UNITED STATES PATENTS
3,772,702  11/1973  Nielsen .............................. 343/18 E
3,789,405  1/1974   Nielsen .............................. 343/18 E

*Primary Examiner*—T. H. Tubbesing
*Attorney, Agent, or Firm*—Richard S. Sciascia; Joseph M. St. Amand

EXEMPLARY CLAIM

1. A radar counter-countermeasure system, including the combination of a normal radar system and counter-countermeasure circuitry, a radar receiver comprising:
   a. an IF amplifier whose signal input is received from the pre IF stage of a normal radar system,
   b. an IF limiter to which the output of said IF amplifier is fed,
   c. a video detector connected to the output of said IF limiter,
   d. the video signal output of said detector being fed to counter-countermeasure circuitry and operator range scope of said normal radar system,
   e. a memory and delayed AGC circuit means whose output is connected to and controls the gain of said IF amplifier for maintaining the target IF signal at desired operating threshold level,
   f. radar video, AGC, and gate signals from the normal radar system being fed to said memory and delayed AGC circuit at respective inputs thereto,
   g. said memory and delayed AGC circuit also being connected to the counter-countermeasure circuitry for receiving control signals therefrom,
   h. said memory and delayed AGC circuit providing delayed AGC voltage during normal target tracking, and providing AGC memory during periods of interference by storing the last gain setting and coasting at that setting upon receiving said control signals from the counter-countermeasure circuitry, wherein target video signal level suppression resulting from intentional and unintentional interferences is prevented and target video signal level at the output of said detector is controlled only by AGC action caused by the target itself even in the presence of interference.

3 Claims, 4 Drawing Figures

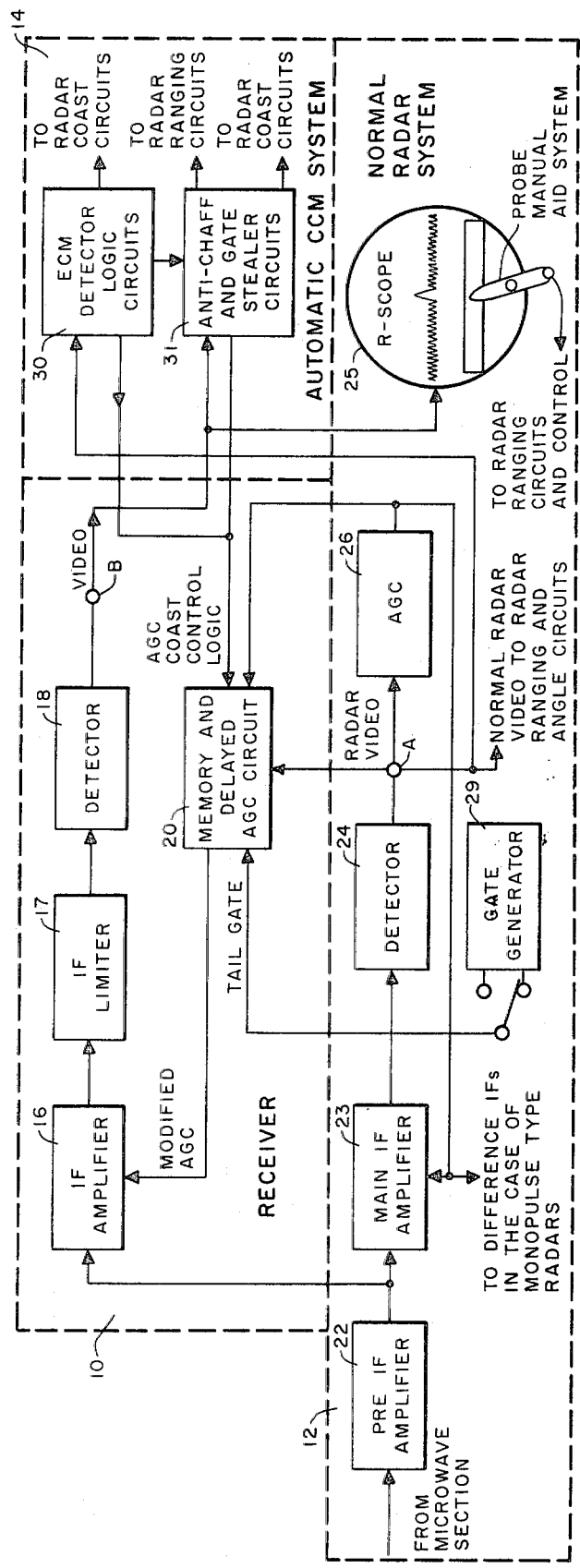
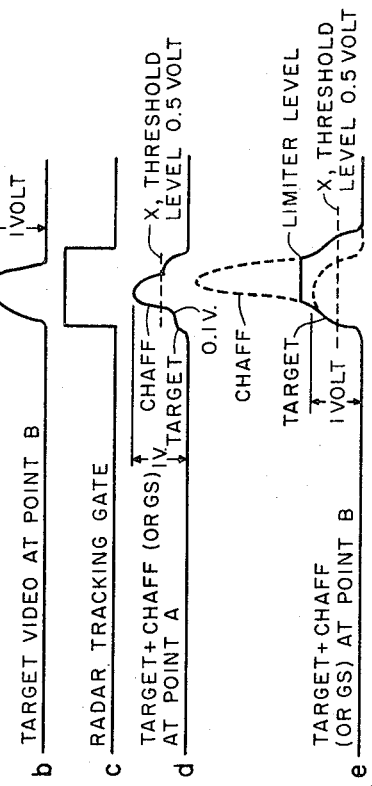
FIG. 1
FIG. 2
JOHN Di PERRY
INVENTOR.

JOHN Di PERRY
INVENTOR.

AUTOMATIC GAIN INTEGRATOR CONTROL

The invention herein described may be manufactured and used by or for the Government of the United States of America for governmental purposes without the payment of any royalties thereon or therefor.

The present invention relates to radar countermeasure means and more particularly to radar counter-countermeasure for use in the presence of chaff or gate stealer countermeasures.

The counter-countermeasure (CCM) capability of previous systems was limited to only a few db of jamming to signal ratio (JSR). Prior systems used the video output of normal radar IF system to operate the CCM circuitry and radar scope display. Normal radar output video is affected by countermeasures such as chaff, gate stealer type jamming, electronic countermeasures, etc. Also, the target is suppressed below the threshold level of the CCM circuitry and below visibility on radar-scope display with the old methods.

The instant invention provides missile guidance radar systems with greater counter-countermeasures (CCM) capability when used in conjunction with other components of a CCM system, as described herein. The invention provides the properties of a receiver with no AGC for operation against chaff and gate stealer jamming, and also provides the properties of a receiver with AGC for operation against normal clutter such as ground, sea, and cloud returns.

The receiver of the present invention prevents target level suppression resulting from chaff, gate stealer and electronic countermeasures (ECM) by enemy aircraft. The target level at the output of the instant receiver is controlled only by the AGC action developed by the target itself even in the presence of interference.

In this invention, an automatic gain control (AGC) having a memory stage is used so that when other equipment of the radar system detects the presence of a countermeasure, the gain setting last used prior to jamming is stored and the gain control coasts at that setting. The instant receiver will operate with other CCM components, such as copending U.S. Pat. applications, Ser. No. 317,850 for Manual Probe Tracking System, filed Oct. 21, 1963, now U.S. Pat. No. 3,217,320, and Ser. No. 431,490 for "Manual Probe Acquisition System," filed Feb. 3, 1965.

It is an object of the present invention therefore, to provide a novel radar counter-countermeasure system.

Another object of the invention is to provide a novel receiver for radar systems to prevent target level suppression as the result of chaff, gate stealer and electronic countermeasures.

A further object of the invention is to provide a memory automatic gain control.

Other objects and many of the attendant advantages of this invention will become readily appreciated as the same becomes better understood by reference to the following detailed description when considered in connection with the accompanying drawings wherein:

FIG. 1 is a block diagram showing the receiver of the present invention connected to a radar system and CCM system.

FIG. 2 shows typical target video and gate pulses describing operation of prior radar receivers vs. the receiver of the instant invention in a chaff and gate stealer environment.

Referring now to the drawings, like characters refer to like parts in each of the figures.

Figure 3:
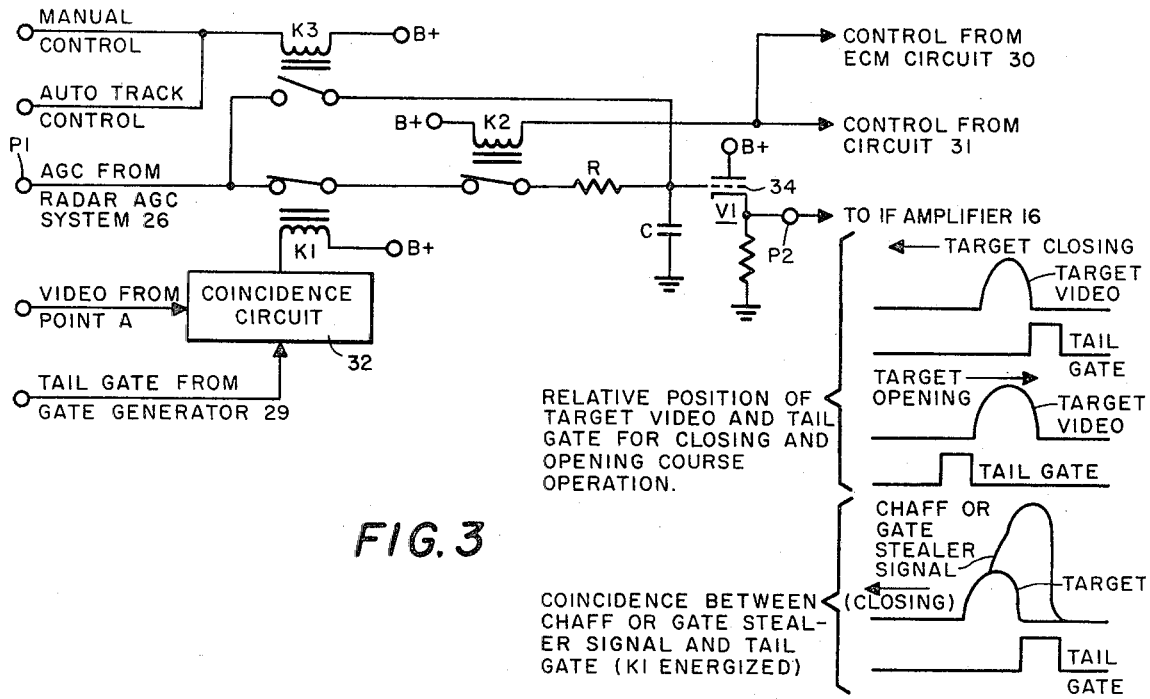
FIG. 3 is a diagrammatic sketch of one embodiment of the memory and delayed AGC system circuit in the invention receiver of FIG. 1, shown in a target tracking mode.

FIG. 1 shows a block diagram of the invention receiver 10 connected to a radar system 12 and to an automatic counter-countermeasures (CCM) system 14. The invention consists of an intermediate frequency (IF) amplifier 16, a conventional IF limiter 17 which limits the amplitude of signals passing therethrough, a conventional video detector 18, and a memory and delayed AGC circuit 20. The IF amplifier 16 receives its input signal from the output of the radar pre-IF amplifier 22 as does the radar main-IF amplifier 23. The output of IF amplifier 16 is fed to IF limiter 17. The output of IF limiter 17 is fed to detector 18. The output of detector 18 is fed to the automatic CCM system 14 (consisting of conventional circuitry) and the radar operator's range R-scope 25. The memory and delayed AGC circuit 20 receives the AGC voltage from the radar AGC system 26. The radar early and late gates are fed to the memory and delayed AGC circuit 20 from the radar range gate generator 29. The radar video is fed to the memory and delayed AGC circuit 20 from radar system detector 24 at point A. The AGC memory (coast) control is generated within the memory and delayed AGC circuit for self-dispensed chaff and gate stealer operation and is received from the ECM detector 30 of CCM system 14 during ECM jamming and from the anti-chaff and gate-stealer detector 31 during forward-dispensed chaff. The output of the memory and delayed AGC circuit 20 is the modified AGC voltage which controls the gain of the IF amplifier 16. The IF amplifier 16 is identical to the radar main-IF amplifier 23 and both are interchangeable.

The Memory and Delayed AGC Circuit 20 of receiver 10 in FIG. 1 is used to automatically control the gain of IF amplifier 16 at all times during target tracking operation. The logic of this circuit is to provide a delayed (integrated) AGC voltage during normal (non-interference) target tracking and to provide an automatically controlled AGC memory (coast) during periods of chaff, gate stealing and electronic countermeasures. This logic is used to control the gain of receiver 10 such that the target video level at point B, FIG. 1 is maintained above the operating threshold ($x$, FIG. 2) level of anti chaff and gate stealer circuit 31 in CCM system 14 of FIG. 1 regardless of the chaff interference level or the combined interference plus target level received.

Figure 4:
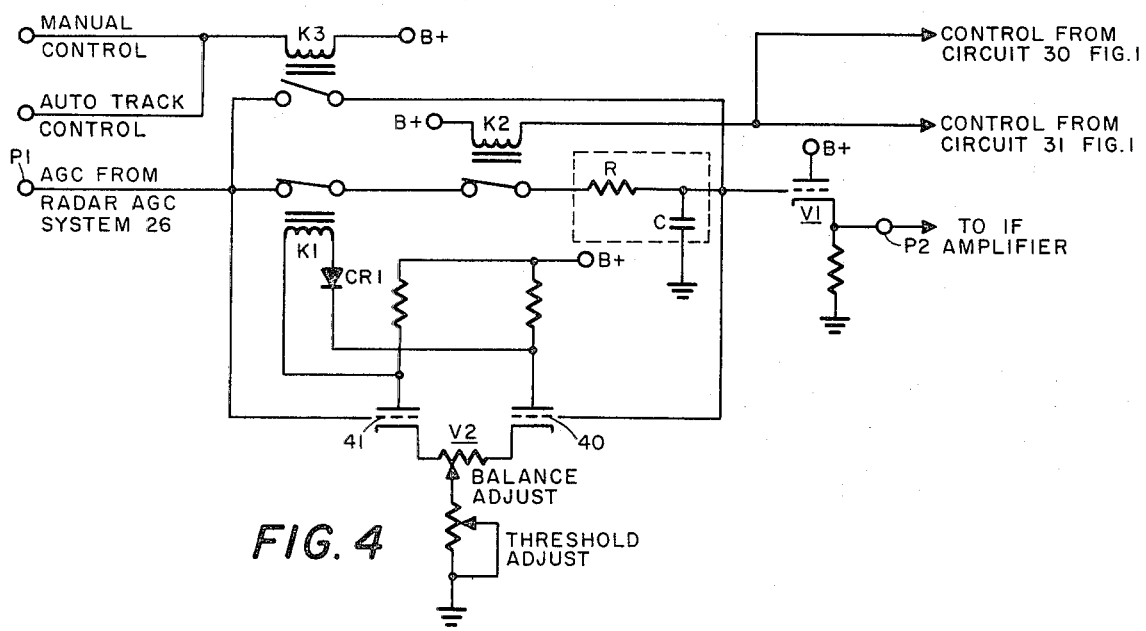
FIG. 4 is a circuit diagram of another embodiment for the memory and delayed AGC system, also shown in a target tracking mode.

Two embodiments of the memory and delayed AGC system 20 are described herein, one system is shown in FIG. 3 and a second system is shown in FIG. 4; the system of FIG. 4 provides some advantages over the system of FIG. 3.

The simplified diagram of FIG. 3 helps to illustrate the operation of the first system. The AGC voltage from radar AGC system 26, FIG. 1, is connected to point P1 of FIG. 3. If a target is being tracked, relays K1, K2 and K3 are in the mode shown in FIG. 3. In this mode, the radar AGC voltage is fed to point P2 through the contacts of relays K1 and K2, an integration circuit (resistor R and capacitor C) and cathode follower V1. Under a normal tracking condition coincidence circuit 32 receives video signals from point A FIG. 1 and a tail gate signal from gate generator 29 FIG. 1. The relative position of the target video signal and tail gate signal for closing and opening course operation is shown in FIG. 3. Relay K1 in FIG. 3 switches the position of the tail gate signal automatically (controlled from circuit 29 FIG. 1) when the target changes course. Relay K1 of FIG. 3 is energized (opened) only when the tail gate makes coincidence with a signal as shown in FIG. 3.

Under normal tracking operation (no interference) the AGC voltage is delayed and is continuously stored by capacitor C of the integrator circuit. The AGC voltage present at the grid 34 of cathode follower V1 is delayed by a period equal to RC. This is a slow changing voltage-relatively, and thus provides a steady gain control to IF amplifier 16. As the target approaches zero range, the received signal level increases. The radar AGC voltage and the delayed AGC voltage will increase proportionately. The gain of the receivers is reduced by AGC action to maintain a constant level target at points A and B of FIG. 1 (usually about 1 volt, for example). The reducing gain level of receiver 10 prevents normal land, sea, or ground clutter from falsely operating the automatic anti-chaff and anti-gate stealer circuits 31 of FIG. 1.

If chaff or gate stealer jamming is used by a target, K2 will be energized (opened), as shown by signal pulses in FIG. 3. This opens the radar AGC circuit 26 between P1 and the integrating circuit RC. The AGC voltage stored in capacitor C will be held at the normal target signal level since capacitor C cannot be discharged. The target video signal at point B, FIG. 1 (output of receiver 10) will be maintained as shown in curve (e) of FIG. 2 while the target video signal at point A FIG. 1 will be as shown in curve (d) FIG. 2. Since the video of receiver 10 is the video used by circuit 31 in the automatic CCM system 14, operation against chaff and gate stealers is possible.

Relay K2 is operated by circuits 30 and 31 when ECM jamming and forward-dispensed chaff is encountered respectively.

Relay K3 is energized (closed) only prior to target acquisition or manually by the radar operator if desired. Relay K3 is used to charge capacitor C to the same AGC level of the target at the time of initial acquisition.

FIG. 4 shows a schematic diagram of a second embodiment of the memory and delayed AGC system 20 (also shown in a target tracking mode). The functions of this system are identical to the functions of the circuit of FIG. 3; the AGC circuit 26 between P1 and P2 is also identical. The only difference between the two circuits is in the way relay K1 is operated. The circuit of FIG. 3 uses a coincidence circuit 32 with the target video signal and a tail gate signal to operate relay K1. The circuit of FIG. 4 uses a differential amplifier V2 with the delayed AGC fed to grid 40 and the undelayed AGC fed to grid 41. The operation of the circuit of FIG. 4 is as follows: during normal target tracking (no interference) the AGC voltage is stored in capacitor C of the integrator circuit as in the first system. The delayed AGC voltage at grid 40 and the undelayed AGC voltage at grid 41 are nearly equal (balanced). The voltage across the relay K1 coil is zero under this balanced condition thus the relay remains closed as shown (unenergized). If interference as shown in curve (d) of FIG. 2 is encountered, the AGC voltage level at point P1 and grid 41 of differential amplifier V2 quickly changes to the new level determined by the strong interference plus target signal. The delayed AGC voltage at grid 40 does not change because of the long RC time delay. This results in a large unbalanced voltage across the relay K1 coil which forces current to flow through the coil and energize (open) the relay. Relay K1 will remain energized until the interference signal is removed (by circuit 31 FIG. 1 or the probe of R-scope system 25).

The operation of relays K2 and K3 are identical to as in the first system of FIG. 3.

This invention provides two outstanding advantages: first, it provides the desirable qualities of an AGCed receiver to protect against interference from normal ground, sea and cloud clutter, and second, it provides the desirable qualities of a non-AGCed receiver for use against countermeasures interference such as chaff, gate stealers and electronic jamming. These advantages can be described as follows: FIG. 2 curves (a) and (b) show the target video signal at the output of the normal radar 12 second detector point A (FIG. 1) and the output of the invention receiver 10, second detector point B (FIG. 1), respectively, under noninterference conditions (clear environment). The radar tracking gate, curve (c) FIG. 2, is automatically controlled by the radar range servo system to maintain exact range coincidence with the target video signal as shown in FIG. 2. If chaff is dispensed or a gate-stealer jammer is applied by the target and its strength is large, say 10 times greater than the target strength, the output of the normal receiver would be as shown in curve (d) FIG. 2. The voltage of the normal receiver at point A FIG. 1 is held at a total level, for example, of 1 volt (chaff + target) by the fast gain controlling action of the radar AGC system 26. However, the target level is now only 0.1 volt, for example, as can be seen in curve (d) FIG. 2. If the video signal at point A (FIG. 1) was fed to the anti-chaff and anti-gate-stealer circuit 31, the system would not operate under the condition shown in curve (d) FIG. 2. This is true because the operating threshold level (approximately 0.5 volts X in FIG. 2, for example) of circuit 31 is not exceeded by the target video signal. Therefore, as the target signal moves from right to left in FIG. 2, the radar tracking gate signal will move to the right towards the stronger signal of the chaff while the target signal moves to the left away from the gate signal. The video signal shown in curve (e) of FIG. 2 is the output of receiver 10 at point B FIG. 1. The target signal (essentially as shown in FIG. 2) will always exceed the required threshold level for automatic anti-chaff and anti-gate-stealing operations of the types presently known. The receiver of this invention operates equally against closing and opening (in range) moving targets. (FIG. 2 is shown only for closing targets.) The IF limiter 17 of FIG. 1 is used to limit strong signals so that the video signal at point B is never greater than about 1.5 volts, for example, as shown in curve (e) of FIG. 2. This is required to prevent false operation of the anti-chaff and gate stealer circuit 11. Without IF limiter 17, false operation would occur by strong interference signals even though the interference signal would not be within the coincidence gate of circuit 31. The video signal from point B FIG. 1 is also used for operator R-scope 25 display and control by the operator probe system which is a part of the R-scope system. The unaffected target video pulse, by interference, at point B provides the desirable display visibility for operator probe tracking control above and beyond the capability of the automatic system. Thus, the combination of the receiver 10, the automatic CCM system 14 and the operator probe control system 25 provides an optimum CCM system.

Obviously many modifications and variations of the present invention are possible in the light of the above teachings. It is therefore to be understood that within the scope of the appended claims the invention may be practiced otherwise than as specifically described.

What is claimed is:

1. In a radar counter-countermeasure system, including the combination of a normal radar system and counter-countermeasure circuitry, a radar receiver comprising:
    a. an IF amplifier whose signal input is received from the pre IF stage of a normal radar system,
    b. an IF limiter to which the output of said IF amplifier is fed,
    c. a video detector connected to the output of said IF limiter,
    d. the video signal output of said detector being fed to counter-countermeasure circuitry and operator range scope of said normal radar system,
    e. a memory and delayed AGC circuit means whose output is connected to and controls the gain of said IF amplifier for maintaining the target IF signal at desired operating threshold level,
    f. radar video, AGC, and gate signals from the normal radar system being fed to said memory and delayed AGC circuit at respective inputs thereto,
    g. said memory and delayed AGC circuit also being connected to the counter-countermeasure circuitry for receiving control signals therefrom,
    h. said memory and delayed AGC circuit providing delayed AGC voltage during normal target tracking, and providing AGC memory during periods of interference by storing the last gain setting and coasting at that setting upon receiving said control signals from the counter-countermeasure circuitry, wherein target video signal level suppression resulting from intentional and unintentional interferences is prevented and target video signal level at the output of said detector is controlled only by AGC action caused by the target itself even in the presence of interference.

2. A system as in claim 1 wherein the memory and delayed AGC circuit comprises:
    a. an input terminal to which AGC from the normal radar system is fed,
    b. an output terminal which is connected to said IF amplifier,
    c. first, second, and third relay switch means, which are normally closed, closed, and open respectively when in their normal unenergized mode during target tracking,
    d. said input terminal connected to one side of said first and third relay switches,
    e. an RC integration circuit,
    f. said second relay switch connected between the other side of said first relay switch and the input to said RC circuit,
    g. a cathode follower circuit whose output is connected to said output terminal,
    h. the output of said RC circuit and the other side of said third relay switch connected to the input to said cathode follower circuit,
    i. AGC voltage from the normal radar system being connected to said output terminal via said first and second relays, RC circuit, and cathode follower circuit during normal target tracking said AGC voltage being delayed and also continuously stored by said RC circuit,
    j. said third relay means being operable to be energized to close by any of manual and automatic tracking control means,
    k. said second relay means being operable to be energized to open by control signals from the counter-countermeasure circuitry,
    l. a coincidence circuit means connected to said first relay means for energizing said first relay switch to open when any of chaff and gate stealer interference is encountered.

3. A system as in claim 1 wherein the memory and delayed AGC circuit comprises:
    a. an input terminal to which AGC from the normal radar system is fed,
    b. an output terminal which is connected to said IF amplifier,
    c. first, second, and third relay switch means, which are normally closed, closed, and open respectively when in their normal unenergized mode during target tracking,
    d. said input terminal connected to one side of said first and third relay switches,
    e. an RC integration circuit,
    f. said second relay switch connected between the other side of said first relay switch and the input to said RC circuit,
    g. a cathode follower circuit whose output is connected to said output terminal,
    h. the output of said RC circuit and the other side of said third relay switch connected to the input to said cathode follower circuit,
    i. AGC voltage from the normal radar system being connected to said output terminal via said first and second relays, RC circuit, and cathode follower circuit during normal target tracking, said AGC voltage being delayed and also continuously stored by said RC circuit,
    j. said third relay means being operable to be energized to close by any of manual and automatic tracking control means,
    k. said second relay means being operable to be energized to open by control signals from the counter-countermeasure circuitry,
    l. a differential amplifier connected across said input terminal and the output of said RC circuit and operable to energize said first relay switch means to open when interference is encountered.

* * * * *